United States Patent [19]

Burghardt

[11] Patent Number: 5,226,050

[45] Date of Patent: Jul. 6, 1993

[54] SMALL LINE WIDTH TUNABLE LASER

[75] Inventor: Berthold Burghardt, Waake, Fed. Rep. of Germany

[73] Assignee: Lambda Physik Forschungs - und Entwicklungsgesellschaft - GmbH, Göttingen, Fed. Rep. of Germany

[21] Appl. No.: 646,674

[22] Filed: Jan. 25, 1991

[30] Foreign Application Priority Data

Jan. 25, 1990 [DE] Fed. Rep. of Germany ....... 4002162

[51] Int. Cl.⁵ .................................................. H01S 3/10
[52] U.S. Cl. .................................... 372/20; 372/107; 372/108; 372/98; 372/33; 372/9; 372/32
[58] Field of Search ............... 372/19, 20, 98, 99, 372/107, 108, 33, 9, 32

[56] References Cited

U.S. PATENT DOCUMENTS

| 4,864,578 | 9/1989 | Proffitt et al. ................. | 372/20 |
| 4,939,739 | 7/1990 | Hobart et al. ................. | 372/107 |
| 5,048,031 | 9/1991 | Thonn ........................... | 372/19 |
| 5,081,635 | 1/1992 | Wakabayashi et al. ........ | 372/20 |

OTHER PUBLICATIONS

Konig, et al., Article Published in J. Phys. E: Sci. Instrum. *Small Line Width Nanosecond Dye Laser of High Spectral Purity with Double Functional Grating*, 1987.

Olcay, et al. Article Published in Applied Optics, *Tuning of a Narrow Linewidth Pulsed Dye Laser with a Fabry-Perot and Diffraction Grating Over a Large Wavelength Range*, vol. 24, No. 19, Oct. 1, 1985.

Primary Examiner—Léon Scott, Jr.
Attorney, Agent, or Firm—Wallenstein, Wagner & Hattis, Ltd.

[57] ABSTRACT

For small line width tuning of a laser, especially a pulsed dye laser, a reference beam is uncoupled from the laser resonator (10,18) and directed to a beam position photosensor such as an adjacent pair of photo diodes. A control signal for synchronizing the movements of a grating (10) and an etalon (18) of the laser resonator is derived from a local change of the reference beam in order that synchronism may be achieved in the movement of both the etalon and the grating.

9 Claims, 3 Drawing Sheets

SMALL LINE WIDTH TUNABLE LASER

FIELD OF THE INVENTION

The instant invention relates to a small line width tunable laser, especially a small line width tunable dye laser, comprising the features of the precharacterizing part of claim 1.

BACKGROUND OF THE INVENTION

Such a laser is known from U.S. Pat. No. 4,864,578. That laser, however, is a continuous mode dye laser having a bandwidth of 1 MHz. The instant invention, on the other hand, is used preferably with pulsed lasers having a bandwith of 1.2 GHz, in other words three orders of magnitude bigger.

DD 228 117 A1 discloses a resonator arrangement for a tunable laser comprising a single reflecting structural element of such design that good spectral filtering is obtained at high wavelength selectivity and narrow line width. The tuning of the wavelength is continuous and effected by means of pressure variation. The laser beam is expanded by a system of prisms.

A paper by R. König, S. Mory, and A. Rosenfeld published in J.Phys.E.: Sci.Instrum. 20 (1987), pages 200–203.describes a pulsed dye laser with which the beam is expanded in the resonator by means of prisms and the wavelength is tuned by turning a grating and/or an FP etalon.

A pulsed dye laser adapted to be tuned in a wide range of wavelengths by means of an FP etalon and a grating is known also from the paper by Olcay, M. R. et al. "Tuning of a narrow linewidth pulsed dye laser with a Fabry-Pérot and diffraction grating over a large wavelength range" published in Applied Optics, vol.24, 1985, no. 19, pages 3146–3150.

DE 37 44 323 Al discloses a laser with which stabilization of the frequency o the laser beam is achieved by inputting part thereof into a Fabry-Pérot interferometer so as to derive an adjustment signal for the setting of a wavelength selective member. The ring system of the Fabry-Pérot interferometer is imaged on a beam position photosensor such as an adjacent pair of photo diodes so that it may be compared with a memorized reference signal so that a setting signal may be obtained for adjustment of the wavelength selective member of the laser.

The instant invention starts from a different problem than stabilizing the frequency of a laser beam.

It is known to narrow down the line or bandwidth of a pulsed laser, especially a dye laser, by providing an etalon in the laser resonator in addition to the tuning grating of the laser. The etalon considerably reduces the bandwidth of the laser beam because of its selective transmission properties. For tuning such a laser, the grating and the etalon must be synchronized. These two wavelength selective members (etalon and grating) must be positioned with respect to each other in such manner that the transmission of the etalon will correspond to the wavelength which is given by the grating. The etalon may be replaced by other wavelength selective means, such as a Fabry-Pérot interferometer, double refractive crystals, and the like.

When an etalon is applied, the alignment of the etalon with the grating is accomplished by slightly tilting the etalon with respect to the laser beam axis.

Now, if the wavelength of the laser is to be tuned (varied) both the grating and the etalon located inside the resonant cavity (so-called intracavity etalon) must be tilted in synchronism. It is the difficulties encountered with such synchronous adjustments of wavelength selective members (e.g. grating and etalon) that the instant invention is directed to.

With the state of the art, continuous tuning of the laser wavelength can be effected only in a very limited range of approximately 1 nm due to the fact that so-called walk-off losses caused by the etalon in the resonant cavity occur when the grating and etalon are moved in synchronism. Furthermore, the minutest deviations from linearity of the grating and etalon drive will result in desynchronization so that, in the extreme, the laser will start to oscillate simultaneously at two adjacent transmission wavelength of the etalon.

SUMMARY OF THE INVENTION

The invention is aimed at providing a small line width tunable laser which permits accurate tuning without loss in performance over a rather wide range of wavelengths.

The laser solving that problem in accordance with the invention is characterized in the claims.

The invention thus makes it possible to determine any desynchronization of the two wavelength selective members (e.g. grating and etalon) so as to obtain a control signal for adjusting at least one of the two members and apply said signal in feedback to the drive of that member, thereby assuring the synchronous tuning of the laser wavelength.

The invention further permits to line up in an easy manner individual tuning ranges of the laser, especially the dye laser, so that automatic tuning of the laser wavelength by means of the etalon is offered over the entire wavelength range of a particular dye (e.g. 30 nm).

The invention makes use of the finding that desynchronization of the grating and etalon will lead not only to reduced light intensity of the laser beam but also result in an ever so small shift in position of the laser beam in the laser resonator. Such a change in position and/or direction of the beam can be detected with the aid of a reference beam, suitably uncoupled, and a control signal then may be derived therefrom for use in synchronizing the two wavelength selective members.

BRIEF DESCRIPTION OF THE DRAWING

The invention will be described further, by way of example, with reference to the accompanying drawings, in which.

DESCRIPTION OF PREFERRED EMBODIMENTS

Figure 1:
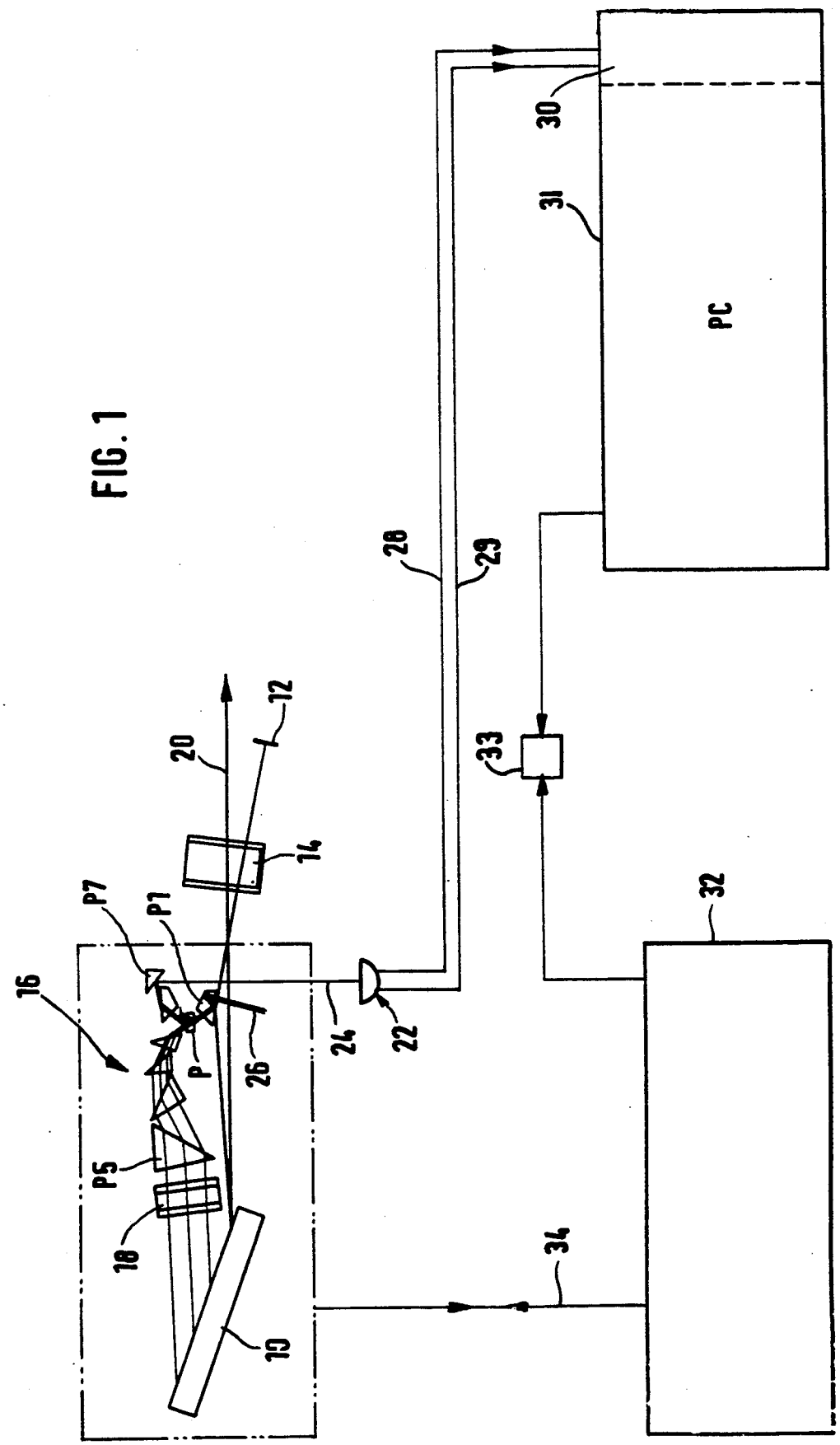
FIG. 1 is a diagrammatic presentation of a pulsed laser with an oscillator and preamplifier, including a computer and separate control for the dye laser.

FIG. 1 illustrates a pulsed dye laser pumped by an excimer laser and including a resonator composed of a grating 10 and an end mirror 12. Inside the resonant cavity there is a dye cuvette 14 containing a dye in which a pump in the present case an excimer laser (not shown) causes population inversion.

The laser moreover comprises a so-called beam expander 16 positioned in the beam path of the resonant cavity to expand the laser beam, whereby the resolution of the grating 10 can be enhanced, as is known.

Likewise positioned in the resonant cavity, in a manner known per se, is an etalon 18 to reduce the bandwidth of the laser beam.

For tuning, i.e. changing the wavelength of the laser, the grating 10 is pivoted in per se known manner by a mechanical control mechanism (not shown). The wavelength of the reflected radiation is adjusted by the change of the angle between the laser beam and the grating. The etalon 18 must be tilted in synchronism with the grating 10.

Figure 2:
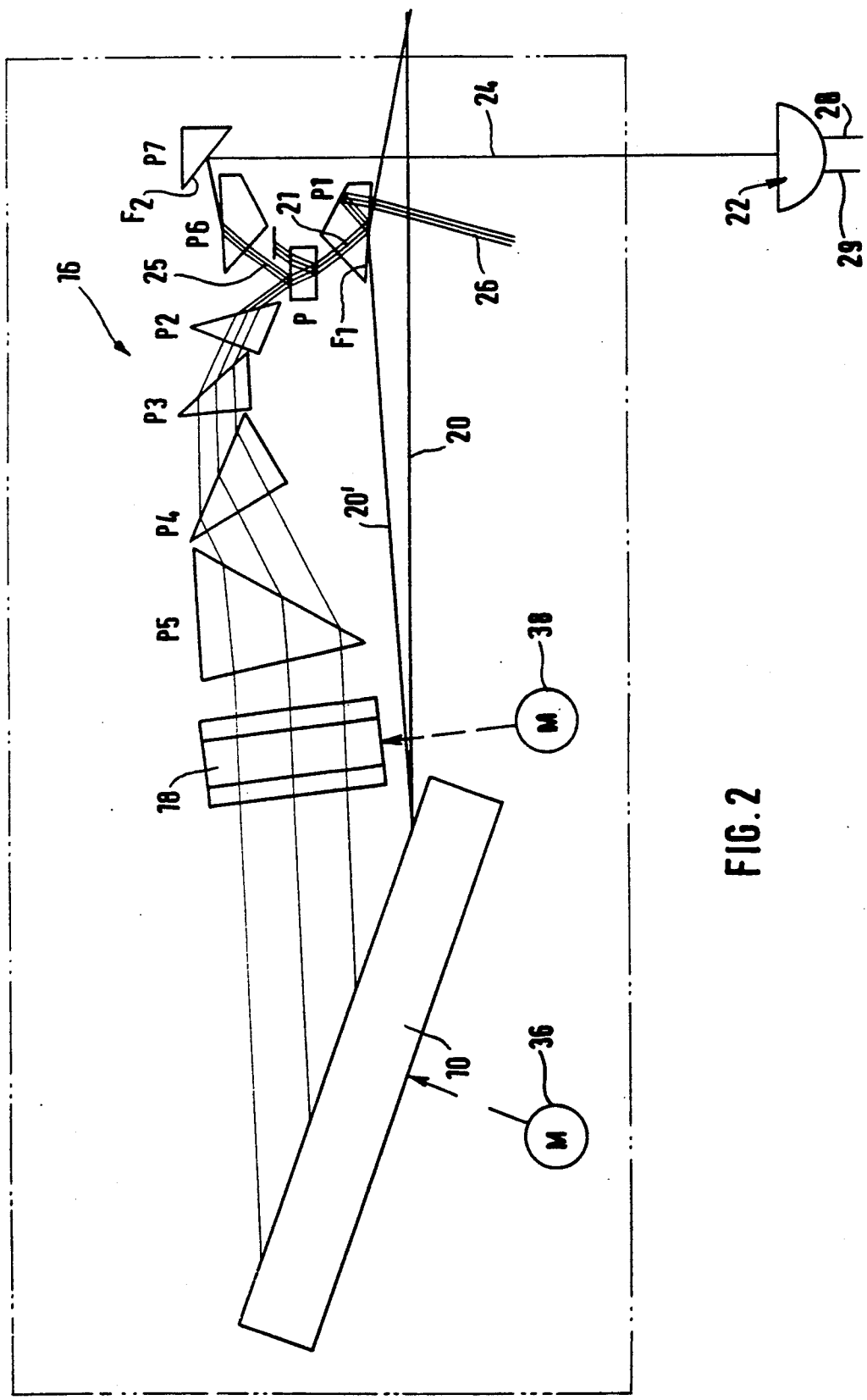
FIG. 2 shows details essential to the invention of the dye laser.

FIG. 2 shows essential details needed to do that with the dye laser according to FIG. 1. Corresponding elements are marked by the same reference numerals throughout.

The beam expander 16 consists of prisms P1, P2, P3, P4, and P5. A laser beam reflected by the end mirror 12 is refracted by prism P1 in the direction of prism P2, leaving prism P5 as a substantially wider beam, as may be seen in FIGS. 1 and 2.

Next to the laser beam passing through prisms P1 to P5, FIGS. 1 and 2 show another beam 20' which is reflected at surface F1 of prism P1 (FIG. 2) in the direction of the grating 10. It is indeed reflected at the grating 10, then passes through the dye cuvette 14 in a path which differs from that of the resonant beam oscillating between the grating 10 and the end mirror 12, and finally is uncoupled from the resonator as laser beam 20. The uncoupling of the beam 20 from the resonator corresponds to German patent 29 18 863. Additional stimulation of radiation in the dye cuvette 14 is provoked where the beam 20 passes through the cuvette. To that end, the dye molecules in the cuvette are pumped also at the location where the beam 20 passes through the cuvette.

As shown in FIGS. 1 and 2 (especially FIG. 2), a plate P with parallel faces is positioned in the resonant beam path between prisms P1 and P2 to establish synchronization of the etalon 18 with respect to the grating 10. Part of the oscillating beam reflected from the grating 10 through the etalon 18 is coupled out at the plate P with the parallel faces. This uncoupled part beam 25 (FIG. 2) first passes through a prism P6 for compensation of the expansion and dispersion caused by prism P1. Thereupon the part beam 25 is deflected at the reflecting base $F_2$ of a prism P7 in order to be directed as reference beam 24 to a beam position photosensor such as an adjacent pair of photo diodes 22, such as a double photodiode or diode array. The reference beam 24, having been uncoupled from the resonator, is not disturbed by stray laser light turning back from the final and preamplifier stages of the dye laser into the resonant cavity. Reference numeral 26 designates another partial beam 26 which is not of particular interest here.

When the grating 10 and the etalon 18 are adjusted for tuning of the wavelength of the laser, desynchronization between grating and etalon will bring about a shift in the position of the reference beam 24 with respect to the beam position photosensor 22 and that can be determined directly there. A corresponding electrical signal is transmitted from the beam position photosensor 22 through lines 28, 29 to an A/D converter 30 and then input into a computer PC 31 for further processing. The computer PC calculates a control signal in response to the deviation of the place of the reference beam 24 from a rated position and, based on that control signal, the tilting angle of the grating 10 or etalon 18 is adjusted so that the reference beam 24 once more will adopt its desired position. The deviation of the direction of the reference beam 24 with respect to its rated position can be determined by means of the beam position photosensor 22 and provides information both of the direction of desynchronization (phase) and of the amount of desynchronization which is evaluated by the computer PC.

A control signal calculated by the computer PC for adjusting the angle of tilt of the etalon 18 is applied through an interface 33 to the actual control means 32 for the grating and the etalon. Such mechanical control means are known.

In more detail, it is known in the prior art to control the two "wavelength selective members" (e.g., the grating 10 and the etalon 18) synchronously by means of step motors 36, 38 (FIG. 2). For example, when tuning the laser wavelength, both the grating 10 and the etalon 18 are rotated by ten steps. Such tuning starts from an ideal alignment of grating and etalon so that the reference beam of the invention is directed exactly at the middle of the diode pair 22.

The output signals of the diode 22 are transferred to a difference amplifier (not shown) at the input of the A/D converter 30. If the laser beam is centered exactly between the elements of the diode pair, the signals on lines 28, 29 will be equal, and the output signal of the difference amplifier will be zero. If the laser beam shifts due to a misalignment of the grating and the etalon, the output signal of the difference amplifier will no longer be zero. The direction of the shifting is reflected in the sign of the output signal of the difference amplifier.

Experimentally, the direction of misalignment, i.e., where the grating or the etalon is rotated too much, can be related to the sign of the output signal of the difference amplifier. Also, the amplitude of the output signal of the difference amplifier reflects the magnitude of the misalignment. For a given laser system, these dependencies must be determined experimentally, since the magnitude of the output signal of the difference amplifier depends also on the position of the diodes with respect to the reference beam 24.

For example, if normally each tuning step of the laser includes a rotation of both the grating and the etalon by ten steps, and if a misalignment is evidenced from a difference in the output signal in the difference amplifier, and having a certain magnitude and sign, this misalignment is compensated for by rotating the grating only nine steps, whereas the etalon is still rotated by ten steps. A correct synchronization of the grating and the etalon is reached when the output signal of the difference amplifier is zero again. In addition to using a diode pair as a position sensor 22, it will be evident to those skilled in the art that a variety of such sensors may be employed, such as charge coupled device arrays or the like.

Figure 3:
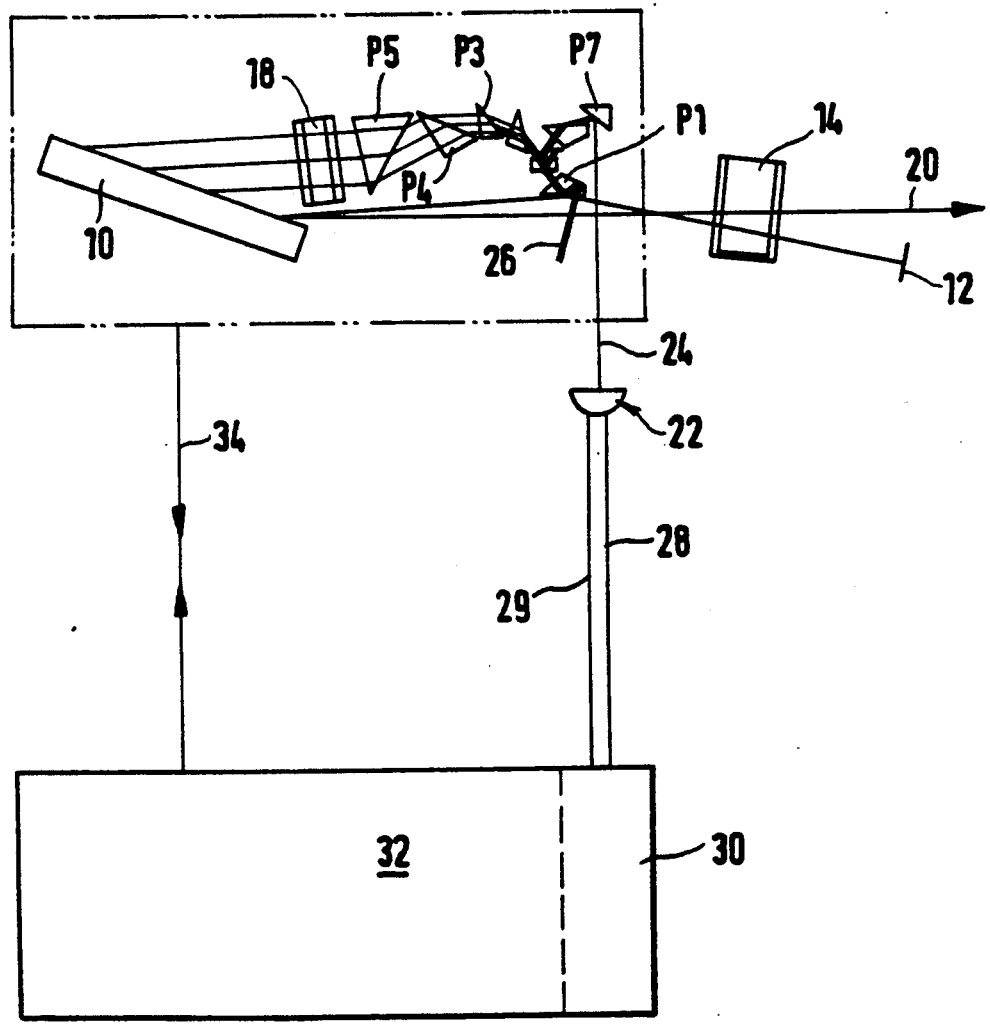
FIG. 3 is a diagrammatic presentation of another embodiment of a dye laser which is controlled according to the invention.

FIG. 3 presents a modification of the embodiment of laser control shown in FIGS. 1 and 2. This modified embodiment does not comprise a separate computer PC. Instead, the measurement signal arriving on lines 28, 29 from the beam position detector 22 (and being a measure of desynchronization) is entered directly into the integrated laser control means 32 through and A/D converter 30. The control signal for synchronizing the etalon 18 and the grating 10 is inputted directly via a line 34.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

I claim:

1. A tunable laser comprising:
   at least two wavelength selecting members in a given path of a resonant beam of variable wavelength, said at least two wavelength selecting members being rotatable to specific wavelength-dependent angular orientations with respect to said given path to maximize the intensity of said beam at a chosen wavelength, wherein relative misorientation of one of said wavelength selecting members with respect to the other of said wavelength selecting members causes a divergence of said resonant beam from said given path;
   first control means for varying the orientations of said wavelength selecting members to vary the wavelength of said resonant beam over a range of wavelength values to a chosen wavelength;
   detector means for providing a control signal indicative of said divergence; and
   second control means responsive to said control signal for operating said first control means to reduce said divergence.

2. The laser of claim 1 wherein said detector means includes reference beam means for producing a reference beam derived from said resonant beam and following a reference beam path which varies in direction from a given reference beam path responsively to said divergence, and;
   optical sensing means disposed in said path of said reference beam and including means responsive to changes in said direction of said reference beam for providing said control signal.

3. The laser of claim 2 wherein said first control means includes first motor drive means for bidirectionally rotatingly driving one of said wavelength selecting members over a range of angular positions and second motor drive for bidirectionally rotatingly driving another of said wavelength selecting members over a range of angular positions, said optical sensing means includes means responsive to changes in the direction of said reference beam in a first direction away from said given reference beam path for producing an overrotation-indicating signal condition indicative of overrotation of said one of said wavelength selecting means with respect to the other of said wavelength selecting means, and means responsive to changes in the direction of said reference beam away from said given reference beam path in a second direction different from said first direction for producing an underrotation-indicating signal condition indicative of underrotation of said one of said wavelength selecting members with respect to said other of said wavelength selecting members, and said second control means includes means responsive to said overrotation-indicating and underrotation-indicating signal conditions for controlling said first motor drive means to move said reference beam towards said given reference beam path.

4. The laser of claim 3 wherein said optical sensing means includes first and second photosensing systems disposed to be equally excited when said reference beam follows said given reference beam path and to be unequally excited so as to indicate in which direction said reference beam has moved away from said given reference beam path, said photosensing systems including means for producing respectively said overrotation-indicating and underrotation-indicating signal conditions responsively to overexcitation and underexcitation of said first photosensing system with respect to said second photosensing system.

5. The laser of claim 4 wherein one of said wavelength selecting members is a diffraction grating and the other of said wavelength selecting members is an etalon.

6. The laser of claim 2 including a beam splitter disposed in said resonant beam path and configured to split out said reference beam from said resonant beam.

7. A method for controlling a tunable laser having at least two wavelength selecting members in a given path of a resonant beam of variable wavelength, said at least two wavelength selecting members being rotatable to specific wavelength-dependent angular orientations with respect to said given resonant beam path to maximize the intensity of said beam at a chosen wavelength, wherein relative misorientation of one of said wavelength selecting members with respect to the other of said wavelength selecting members causes a divergence of said resonant beam from said given resonant beam path comprising the steps of:
   sensing said divergence of said resonant beam; and
   adjusting the orientation of at least one of said wavelength selecting means responsively to said sensing to restore said resonant beam to said given resonant beam path.

8. The method of claim 7 including the steps of deriving a reference beam from said resonant beam so as to deviate from a given reference beam path responsively to said divergence of said resonant beam, and adjusting the orientation of said at least one wavelength selecting members according to the deviation of said reference beam to restore said reference beam to said given reference beam path.

9. The method of claim 8 wherein said laser includes a beam splitter disposed in said resonant beam path and configured to split out and thus derive said reference beam from said resonant beam.

* * * * *